United States Patent [19]

Wallisch et al.

[11] Patent Number: 5,500,124
[45] Date of Patent: Mar. 19, 1996

[54] PROCESS FOR THE PURIFYING WORKING-UP OF REACTION MEDIA AND/OR WASH MEDIA OBTAINED DURING PREPARATION OF CELLULOSE ETHERS

[75] Inventors: Heinz Wallisch, Eltville; Reinhard Dönges, Bad Soden am Taunus; Ulrich Meyer-Blumenroth, Idstein, all of Germany

[73] Assignee: Hoechst AG, Germany

[21] Appl. No.: 984,698

[22] Filed: Dec. 3, 1992

[30] Foreign Application Priority Data

Dec. 6, 1991 [DE] Germany .................. 41 40 272.3

[51] Int. Cl.$^6$ .............................. C02F 1/44; C08B 11/02; C08B 11/04
[52] U.S. Cl. .................. 210/651; 210/758; 210/759; 210/760; 210/702; 536/85; 536/91
[58] Field of Search ................... 210/650, 702, 210/723, 730, 767, 759, 760; 536/84, 85, 91

[56] References Cited

U.S. PATENT DOCUMENTS

| | | | |
|---|---|---|---|
| 3,873,518 | 3/1975 | Strange et al. | 536/91 |
| 4,155,845 | 5/1979 | Ancelle et al. | 210/22 |
| 4,581,446 | 4/1986 | Schulz | 536/91 |
| 4,672,113 | 6/1987 | Wallisch et al. | 536/85 |
| 4,830,753 | 5/1989 | Cabral et al. | 210/638 |
| 4,988,807 | 1/1991 | Christensen et al. | 536/127 |
| 5,218,107 | 6/1993 | Schulz | 536/84 |

FOREIGN PATENT DOCUMENTS 0136518  4/1985  European Pat. Off. .
63-63274  12/1988  Japan .

OTHER PUBLICATIONS

Klinkowski et al. "Ultrafiltration" in *Encyclopedia of Polymer Science and Engineering* pp. 75–105 (1989).
Dönges, R., *British Polymer J.* 23:315–326 (1990).

*Primary Examiner*—Jeffrey Mullis
*Attorney, Agent, or Firm*—Connolly & Hutz

[57] ABSTRACT

The invention relates to a process for the purifying working-up of liquid reaction media and/or wash media obtained during preparation of cellulose ethers, which are insoluble in hot water, from cellulose, an alkali metal hydroxide and at least one etherifying agent in a medium containing water and if appropriate at least one organic solvent, by ultrafiltration of the media into a permeate and concentrate, which comprises carrying out the ultrafiltration of the reaction media and/or wash media at a temperature at or above the flocculation temperature of the cellulose ethers.

17 Claims, No Drawings

PROCESS FOR THE PURIFYING WORKING-UP OF REACTION MEDIA AND/OR WASH MEDIA OBTAINED DURING PREPARATION OF CELLULOSE ETHERS

DESCRIPTION

Cellulose ethers as a rule are prepared by rendering cellulose alkaline and subsequently reacting it with etherifying agents, such as methyl chloride, ethylene oxide, propylene oxide or chloroacetic acid, in the presence of suitable solvents or suspending agents. Depending on the field of use of the cellulose ether, greater or lesser requirements are imposed on its purity, so that a purification step integrated in the preparation process is necessary.

The cellulose ethers prepared have different, temperature-dependent dissolving properties in aqueous media, according to the etherifying agents used and the level of the degree of substitution. In the case of crude, i.e. non-purified, cellulose ethers which are poorly soluble, if at all, in hot water, purification can be carried out by preparation of an aqueous suspension and subsequent separation into solid and decanted liquid. The desired purity of the cellulose ethers can be achieved by repeated suspension in hot water and renewed removal of the aqueous phase. The reaction media and/or wash media obtained during preparation and purification of cellulose ethers are polluted in particular with organic compounds. Given the ever more important requirements of the minimum possible pollution of the environment, it is therefore necessary in particular for wastewaters which contain organic compounds and have a high chemical oxygen demand (COD) to be purified substantially, before they are discharged into waters. Separation and purification processes are therefore sought, with the aid of which liquid reaction media and/or wash media can be purified, removal of the contents of the wastewater which are difficult to degrade biologically being of particular importance.

DE-A-33 31 997 describes a process for the purification of reaction liquids and wash liquids obtained during preparation of cellulose ethers, the reaction liquid or wash liquid first being subjected to distillation in order to remove low-boiling organic reaction products or unreacted reaction components, and the distillation residue then being subjected to ultrafiltration (UF) at a temperature in the range from 30° to 40° C. A disadvantage of this process are the low flow rates (flux rates) achieved during ultrafiltration, which means that it becomes necessary to use very large membrane surfaces, which in the end lead to uneconomical ultrafiltration units.

JP-OS-82/68190 describes a process for the purification of wastewater, which contains nonionic dissolved cellulose ethers, by flocculation with phenolic compounds, such as phenol or tannin. In this process, however, a COD caused by excess flocculating agent remains in the wastewater. This residual COD is removed from the wastewater by oxidation with a chlorine-containing oxidizing agent, such as chlorate or sodium hypochlorite, the formation of AOX (adsorbable organic halogen compounds) resulting from the use of these chlorine-containing oxidizing agents.

There was therefore the urgent demand for a process which enables higher flux rates and therefore lower and economical membrane areas to be achieved by using ultrafiltration, and which, if appropriate, enables the organic compounds contained in the concentrate of the ultrafiltration to be removed in a simple manner.

The invention relates to a process for the purifying working-up of liquid reaction media and/or wash media which are obtained during preparation of cellulose ethers, which are insoluble in hot water, from cellulose, an alkali metal hydroxide and at least one etherifying agent in a medium containing water and if appropriate at least one organic solvent, by ultrafiltration of the media into a permeate and a concentrate. This process comprises carrying out the ultrafiltration of the reaction media and/or wash media at a temperature at or above the flocculation temperature of the cellulose ethers.

It is also an embodiment of this invention that the concentrate of the reaction medium and/or wash medium obtained during the ultrafiltration is treated with an oxidizing agent or by addition of a flocculating agent or a cellulose ether.

The ultrafiltration is carried out with the reaction media and/or wash media obtained during preparation or purification of cellulose ethers. The waste water to be treated originates from the production of an alkylcellulose ether, in particular methylcellulose, an alkylhydroxyalkylcellulose ether, in particular methylhydroxypropylcellulose or methyhydroxyethylcellulose, or an anionic derivative thereof. The cellulose ethers prepared are cellulose ethers which are insoluble in hot water, such as, for example, methylcelluloses, methylcellulose mixed ethers, ethylcelluloses, hydroxypropylcelluloses and mixed ethers thereof.

The cellulose ethers which are insoluble in hot water and are to be purified according to the invention have temperature-dependent flocculation properties. When the temperature is increased, they flocculate out of the aqueous solution.

This phenomenon is known to the expert and can be found in the technical literature, such as R. Dönges, British Polymer Journal 23, 315–326 (1990).

In the present invention, the flocculation temperature is defined as the temperature at which the transparency of a 1% strength aqueous solution of a cellulose ether has fallen to 50% of its value measured at room temperature, a heating-up rate of 3° C./minute being observed.

The reaction media or wash media essentially comprise inorganic salts, such as sodium chloride, organic by-products of the reaction, unreacted organic reaction components, dissolved cellulose ether constituents and naturally occurring concomitant substances of cellulose and reaction products thereof.

Organic by-products of the reaction are, for example, the alcohols formed by hydrolysis and, if appropriate, polymerization of the etherification reagents employed, and etherification products thereof, such as, for example, methanol, ethanol, dimethyl ether, diethyl ether, ethylene glycol, monomethylglycol, dimethylglycol, ethylglycol, diethylglycol, propylene glycol, monomethylpropylene glycol, dimethylpropylene glycol, diethylene glycol and its alkylated derivatives, dipropylene glycol and its alkylated derivatives and higher homologous polyalkylene glycols and alkylated derivatives thereof.

The cellulose ether content essentially comprises cellulose ether molecules which, because of the low degree of polymerization, are dissolved in the wash medium at the washing temperature. In addition to the abovementioned constituents, the reaction media and wash media to be purified can also contain other constituents such as are usually obtained during preparation of cellulose ethers.

In respect of the technology of ultrafiltration and the materials and units used there, reference is made to Ullmanns Encylopädie der Technischen Chemie (Ullmann's Encyclopedia of Industrial Chemistry), keyword "membranes", Verlag Chemie, Weinheim, 4th Edition, Volume 16, 1978, pages 515–535 and the ultrafiltration units mentioned in DE-A-33 31 997.

In the process according to the invention, for example, a circular plate module is employed which essentially comprises a stack of supporting plates (in particular circular) and guide plates which are clamped between two end plates and are stacked alternately on top of one another. The supporting plates are coated on both sides with drainage layers and membranes and have a bore in the middle as a water passage. The guide plates are used to guide the untreated water. An "RP module" from GKSS-Forschungszentrum Geesthacht GmbH, Hamburg, for example, has proved to be suitable. Units which are comparable in principle are supplied, for example, by the Companies Forschungsinstitut Berghoff GmbH/Tübingen or A/S Danske Sukkerfabrikker Nakskov (DK). Other suitable modules are coiled (spiral) modules or tubular modules. It has been found that it is particularly advantageous to carry out the ultrafiltration in a module in which the shearing forces which occur on the membrane surface are not determined by the flow rate resulting from the volume throughput. If plate modules with stirrers are used, it has been found, in particular, that high shearing forces are generated in these modules and a very small difference in transmembrane pressure difference prevails at the intake and outlet of the ultrafiltration cell, which means that the formation of a secondary membrane is reduced significantly and a high separation efficiency results.

Modules in which the membrane surfaces are moved parallel to one another are also suitable. Such modules are, for example, the Chiral Flow Filter from Herco/Freiberg or similar models from the Companies Membrex and Pall. The pressures are in the range up to 10 bar, preferably between 2 and 7 bar, according to the membranes employed. The membrane component employed in the ultrafiltration in the process according to the invention is, for example, one of a polyether-sulfone, i.e. a polymer built up from p-phenylene units, the units of which are bonded alternately via sulfone or ether groups and which is very stable over a pH range from 1 to 14; however, other materials are also suitable if they meet the requirements stated. The permeate, but also conventional purifying agents, such as aqueous citric or nitric acid solution, can be employed during regeneration of the membranes used in the process.

In the preparation of a methylhydroxyethylcellulose (MHEC), selected as a representative example, from cellulose, methyl chloride, ethylene oxide and aqueous NaOH solution—if appropriate in the presence of an inert organic solvent, such as dimethoxyethane—the following products are obtained in particular in the liquid reaction medium and wash medium during the reaction and after washing out of the crude MHEC with hot water: NaCl, methanol, dimethyl ether, lower and higher, partly methylated ethylene glycols, methyl chloride, ethylene oxide, if appropriate an organic solvent, such as dimethoxyethane, and a cellulose ether content of cellulose ether molecules which possibly have too low or too high a degree of substitution or of cellulose ethers having too low a chain length. A comparable composition can also be obtained after preparation and/or purification of other types of cellulose ether, and then comprises, for example, other salts, such as sodium acetate, other organic solvents, such as dioxane, toluene or diethyl ether, propylene glycols and the like. After removal of the solid residues (which essentially comprise the useful material of the cellulose ether, if appropriate also with certain salt contents), the liquid reaction and wash medium is then advantageously first subjected to distillation, in which the low-boiling organic by-products of the reaction, such as methanol and dimethyl ether, the unreacted low-boiling organic reaction components which as a rule are employed in a molar excess, such as methyl chloride and ethylene oxide, and the organic solvents employed if appropriate, such as dimethoxyethane, can be largely distilled off and separated into the components, for example, by fractional distillation.

The subsequent ultrafiltration is carried out with the residue of the distillation, which essentially comprises (based on the above example) NaCl, a cellulose ether content and low and high molecular weight ethylene glycols or low and high molecular weight ethylene glycol derivatives, as well as naturally occurring impurities of the cellulose and reaction products thereof. During the ultrafiltration, the temperature of the reaction medium or wash medium to be purified is at or above the flocculation temperature of the cellulose ether from the preparation or purification process of which the reaction or wash medium to be purified originates, preferably at a temperature above 40°, preferably 45°, in particular above 60° C.

It is known that the flux rates can be increased by increasing the temperature during the ultrafiltration. However, this is associated with a deterioration in the retention capacity of the UF membrane.

In the process according to the invention, the flux rates also increase significantly if the ultrafiltration is operated at or above the flocculation temperature of the cellulose ether.

Surprisingly, however, the retention capacity of the membrane does not decrease. At these temperatures, not only do the cellulose ethers to be purified themselves change accordingly, but also, against expectations, the COD carriers, which dissolve during the washing operation and can be degraded biologically only very slowly, change their state of solution, so that significantly higher fluxes result during the UF without losses in sharpness of separation.

The ultrafiltration can be carried out discontinuously or also continuously. In the discontinuous procedure, one or more ultrafiltration modules, preceded by a reservoir, can be used. The permeate to be removed from the module or modules (the purified reaction medium and/or wash medium), which has been reduced in COD and has a lower content of constituents which are difficult to degrade, is collected and can be passed to a biological wastewater purification plant.

The concentrate, which in the final stage of the process in the present case essentially comprises a cellulose ether content as well as etherified secondary constituents of cellulose, is then passed further to a second module—if present—after leaving a first module, after which, if appropriate, further modules can also follow; after leaving the last module, it is passed back to the reservoir.

In the continuous procedure, several stages, each of which in turn can also comprise several modules, are combined, the concentrate of a first ultrafiltration stage then not being passed back to a reservoir but being transferred to a second ultrafiltration stage of lower output.

The concentrate leaving the second stage is then correspondingly passed to an even smaller third stage, after which even further stages can also follow, and the permeates leaving the particular stage can be passed directly to a biological wastewater purification plant.

Permeates which can be degraded biologically more easily because the wastewater contents which are difficult to degrade have been largely retained by the ultrafiltration membranes and are therefore in the concentrate are obtained in the two process variants. The resulting permeates are clear liquids can be reduced in COD by more than 50%.

A further reduction in the COD is possible by a subsequent nanofiltration.

The reaction media and/or wash media concentrates which are likewise obtained in the ultrafiltration comprise organic constituents which are difficult to degrade biologically, such as dissolved cellulose ether contents and etherified concomitant substances of cellulose, and are advantageously subjected to after-purification in the process according to the invention. This after-purification can comprise first carrying out oxidation degradation by addition of suitable oxidizing agents, such as hydrogen peroxide and/or ozone (both also in combination with UV light) and if appropriate following this with a biological treatment.

The constituents which can be degraded biologically only slowly and are contained in the concentrate can also be largely removed from the concentrate by addition of flocculating agents or by addition of cellulose ethers which are insoluble in hot water. The addition of flocculating agents or cellulose ethers is advantageously carried out at a temperature above the flocculation temperature of the cellulose ethers, preferably at a temperature above 60° C. Suitable flocculating agents are, preferably, naturally occurring tanning agents, such as tannin and quebracho, and/or commercially available synthetic products, such as phenol condensation products or naphthol/phenol condensation products.

Suitable cellulose ethers are all the products which are insoluble in hot water at the washing temperature, and the cellulose ether, during the preparation of which the wastewater to be treated results, is particularly preferred.

The amount of flocculating agents added depends on the amount of organic constituents contained in the concentrate and is, for example, advantageously in the range from 1000 to 1400 mg/g of organic constituents for tannin. It has also been found that merely increasing the temperature of the UF concentrate, without addition of flocculating agents or cellulose ethers, leads to flocculation of previously dissolved organic constituents.

It has been found that the content of previously non-flocculating organic constituents in the concentrate obtained after the ultrafiltration can be increased considerably by addition of methylhydroxyethylcellulose.

The temperature is advantageously above 60° C.

The COD carriers which can be degraded biologically only slowly and are still contained in the concentrate after the flocculation can be further degraded biologically, if necessary, after the oxidative treatment.

The permeates can be further purified by nanofiltration at a temperature of the reaction medium or wash medium above the flocculation temperature of the cellulose ether.

By nanofiltration there is to be understood a membrane separation process which operates in the transition region from ultrafiltration reverse osmosis. It is chiefly used for removal of low molecular weight organic substances from salt-containing solutions.

The solution to be purified is likewise divided into concentrate and permeate. Coiled modules are usually used, under pressures of between 10 and 40 bar.

The concentrate from the nanofiltration is preferably passed to the UF concentrate, and with this to the flocculation step described. The permeate from the nanofiltration is removed to a biological clarification plant.

It has been found that the same materials and units such as are used in the ultrafiltration are suitable for the nanofiltration, but as a rule a higher pressure level is to be maintained and denser membranes are employed.

The advantages of the process according to the invention can be stated as follows:
  high flux rates during the ultrafiltration
  small membrane surface
and at the same time
  substantial prevention of the formation of a secondary membrane
  flow rates which are highly constant
and with
  separation sharpness which is not reduced
  low content of organic constituents in the purified reaction medium or wash medium
  improved biological degradability of the purified reaction medium or wash medium

EXAMPLES

The washwater employed for the ultrafiltration is obtained by the following preparation process.

Preparation of methylhydroxyethylcellulose 162 g of ground cellulose are rendered alkaline with a solution of 111 g of caustic soda in 200 ml of water in a Lödige mixer for 45 minutes. After being transferred to a pressure-resistant stirred vessel, evacuated and covered with a layer of nitrogen, a mixture of 1260 g of methyl chloride and 24.2 g of ethylene oxide is forced in. Etherification is carried out at 80° to 90° C. for 60 minutes. The resulting product is extracted until largely salt-free with 10 l of hot water, and, after drying, has an $OCH_3$ content of 24.1% and an $OC_2H_4$ content of 3.0%. The washwater from the MHEC preparation is concentrated to a volume of about 3 l to remove the volatile organic constituents, and is used for the ultrafiltration experiments.

Preparation of methylhydroxypropylcellulose 162 g of ground cellulose are rendered alkaline with a solution of 111 g of caustic soda in 200 ml of water in a Lödige mixer for 45 minutes. After being transferred to a pressure-resistant stirred vessel, evacuated and covered with a layer of nitrogen, a mixture of 1260 g of methyl chloride and 70 g of propylene oxide is forced in. Etherification is carried out at 80° to 90° C. for 60 minutes. The resulting product is washed with 10 l of hot water, and, after drying, has an $OCH_3$ content of 24.3% and an $OC_3H_6$ content of 3.2%.

The washwater from the MHPC preparation is concentrated to about 6 l to remove the volatile organic constituents, and is used for the ultrafiltration experiments.

Example 1

A washwater from the preparation of methylhydroxyethylcellulose was pumped through a laboratory cell with a flat channel for purification with the aid of ultrafiltration. A polyether-sulfone membrane from Hoechst AG (Nadir® PES 20H) was employed. A permeate flux of 66 l/m²h was established at the start of the experiment at an operating temperature of 70° C. under an operating pressure of 5 bar. Towards the end of the experiment, the permeate flux dropped to 25 l/m²h. Under these conditions, a permeate, the COD of which had been reduced by 44.8% compared with the COD of the washwater, was obtained.

Example 2

A washwater from the preparation of methylhydroxyethylcellulose, under a load of 13700 mg of COD/l, was pumped through an ultrafiltration cell for reduction of the COD. The ultrafiltration was carried out under an operating pressure of 5 bar at an operating temperature of 70° C. The permeate obtained under these conditions was now loaded with only 7790 mg of COD/l. The permeate throughput dropped from 46 l/m²h to 23 l/m²h during the filtration operation.

Example 3

A washwater from the preparation of methylhydroxyethylcellulose was pumped through a plate module with a stirrer for reduction of COD carriers. A flux of 92 l/m²h, which was constant over the duration of the experiment of 24 h, was established at an operating temperature of 70° C. under an operating pressure of 3 bar. Under these conditions, the COD load of the wastewater was reduced by 52.4%.

Example 4 (Comparison Example)

A washwater from the preparation of methylhydroxyethylcellulose was pumped through a plate module for reduction of COD carriers. An initial flux of 14 l/m²h and a final flux of 2.1 l/m²h was achieved at an operating temperature of 30° C. under an operating pressure of 5.5 bar. The COD of the wastewater of 14200 mg of $O_2$/l was reduced to 7700 mg of $O_2$/l in the permeate under these conditions.

Example 5

The washwater from a methylhydroxypropylcellulose preparation loaded with a COD of 16700 mg of $O_2$/l was subjected to ultrafiltration in a laboratory cell for COD depletion. An initial flux of 69 l/m²h, which was reduced at the end to 33 l/m²h, was reached under a pressure of 4 bar at an operating temperature of 70° C. The COD in the permeate was 9900 mg of $O_2$/l. The COD of the MHPC washwater had thus been reduced by 40.7% by the UF.

Example 6

A washwater from the preparation of methylhydroxyethylcellulose was subjected to ultrafiltration in a plate module at 70° C. A concentrate which was enriched in the COD by 2474 mg of $O_2$/l was obtained. By addition of moist methylhydroxycellulose, the COD content which had been enriched by the ultrafiltration could be largely flocculated out at a flocculation temperature of >80° C. The ultrafiltration was carried out with the polysulfone membrane from Hoechst AG (Nadir® PS 100).

Example 7

After ultrafiltration of a washwater from the preparation of methylhydroxyethylcellulose at 70° C., a concentrate which had risen in its COD to 22050 mg of $O_2$/l resulted. Compared with the COD of the washwater, the COD enrichment in the concentrate was 29.7%. About 75% of the COD enriched by the ultrafiltration was able to be removed from the concentrate by flocculation with moist methylhydroxyethylcellulose at a temperature above the coagulation point of methylhydroxyethylcellulose. The same membrane as in Example 6 was employed for the ultrafiltration.

Example 8

During ultrafiltration of a washwater from the preparation of methylhydroxyethylcellulose at 70° C., a concentrate was obtained, the COD of which was increased by 6700 mg of $O_2$/l in comparison with the COD of the wastewater. With the aid of moist methylhydroxyethylcellulose, a COD content of 5200 mg of $O_2$/l was able to be removed from the concentrate by flocculation at a temperature above the coagulation point of methylhydroxyethylcellulose. The ultrafiltration was carried out with a polyether-sulfone membrane from Hoechst AG (Nadir® PES 30 H).

Example 9

A washwater from the preparation of methylhydroxyethylcellulose was divided into a permeate depleted in COD and a concentrate enriched in COD with the aid of ultrafiltration at 70° C. In comparison with the washwater, the COD in the concentrate was increased by 5760 mg of $O_2$/l. The COD carriers enriched by the ultrafiltration, which resulted in an increase in the COD, were to be flocculated virtually completely by addition of 4.2 g of pure tannin (DAB 7) to the concentrate. A polysulfone membrane from Hoechst AG (Nadir® PS 100) was used for the ultrafiltration.

Example 10

A concentrate which was enriched in the COD by 4900 mg of $O_2$/l was obtained from a washwater from the preparation of methylhydroxyethylcellulose by ultrafiltration at 70° C. By heating the concentrate to about 100° C., its COD was reduced by 2000 mg of $O_2$/l as a result of flocculation. The same membrane as in Example 9 was employed for the ultrafiltration.

Example 11

A concentrate obtained from a washwater from the preparation of methylhydroxyethylcellulose by ultrafiltration at 70° C. was diluted with water to remove cloudiness, so that an aqueous solution which had a COD of 7400 mg of $O_2$/l was formed. 13.3 g of $H_2O_2$ (30% strength) was then added to this solution and the mixture was irradiated with a high pressure mercury lamp, which had an output of 700 W, for 15 minutes. The COD of the UF concentrate solution was reduced by 30% by the $H_2O_2$/UV treatment. The biological degradability was improved by 925 units from 95 mg of $O_2$/l of $BOD_5$ to 1020 mg of $O_2$/l of $BOD_5$.

Example 12 (Comparison Example to Example 11)

A washwater from the preparation of methylhydroxyethylcellulose having a COD of 11500 mg of $O_2$/l was subjected to an $H_2O_2$/UV treatment. 13.3 g of $H_2O_2$ (30% strength) were introduced into 1 l of washwater, and this washwater containing $H_2O_2$ was then irradiated with a high pressure mercury lamp of 100 W output for 15 minutes. After the $_2O_2$/UV treatment, a residual COD of 9900 mg of $O_2$/l was present in the washwater treated oxidatively. The COD of the washwater had been reduced by 1600 mg of $O_2$/l. The biological degradability by microorganisms rose by 430 units from 1700 mg of $O_2$/l of $BOD_5$ to 2200 mg of $O_2$/l of $BOD_5$.

Example 13

A permeate having a COD of 8600 mg of $O_2$/l was obtained from a washwater from the preparation of methylhydroxyethylcellulose by ultrafiltration at 70° C. For further reduction in the COD, this permeate was subjected to a nanofiltration. A flux of 125 l/m²h was established under an operating pressure of 30 bar at an operating temperature of 72° C. The filtrate obtained from the nanofiltration under these conditions was depleted in COD by 24% compared with the UF permeate

TABLE 1

Influence of the temperature and the stirring operation in the ultrafiltration cell on the ultrafiltration
A polyether-sulfone membrane from Hoechst AG (Nadir ® PES 20 H) was employed.

| Ex. | Module | Temp. (°C.) | Pressure (bar) | Flux start (l/m² · h) | Flux end (l/m² · h) | COD washwater (mg of $O_2$/l) | COD permeate (mg of $O_2$/l) | COD reduction (%) |
|---|---|---|---|---|---|---|---|---|
| 1 | Laboratory cell (flat channel) | 70 | 5 | 66 | 25 | 15 400 | 8 500 | 44.8 |
| 2 | Laboratory cell (flat channel) | 70 | 5 | 46 | 23 | 13 700 | 7 790 | 43.1 |
| 3 | Plate module with stirrer | 70 | 3 | 92 | 92 | 14 800 | 7 050 | 52.4 |
| 4[1)] | Plate module without stirrer | 30 | 5.5 | 14 | 2.1 | 14 200 | 7 700 | 45.8 |
| 5 | Laboratory cell (flat channel) | 70 | 4 | 69 | 33 | 16 700 | 9 900 | 40.7 |

[1)] = comparison example

TABLE 2

Removal of the COD carriers which can be degraded biologically only slowly and are enriched in the concentrate after the ultrafiltration (UF), by using flocculating agents or by the cellulose ether itself

| | | Concentrate after UF at 70° C. | | Concentrate after flocculation | |
|---|---|---|---|---|---|
| Ex. No. | COD washwater (mg of $O_2$/l) | Volume (%) | COD (mg of $O_2$/l) | COD enrichment (mg of $O_2$/l) | COD (mg of $O_2$l) | COD depletion (mg of $O_2$l) |
| 6 | 17 100 | 70 | 19 574 | 2 474 | 17 174 | 2 400 |
| 7 | 17 100 | 60 | 22 050 | 4 950 | 18 305 | 3 745 |
| 8 | 17 100 | 50 | 23 800 | 6 700 | 18 600 | 5 200 |
| 9 | 17 100 | 55 | 22 860 | 5 760 | 17 240 | 5 620 |
| 10 | 17 100 | 60 | 22 000 | 4 900 | 20 000 | 2 000 |

We claim:

1. A method for purifying a waste water from the preparation of a cellulose ether from cellulose and an etherifying agent, wherein the waste water is separated into a permeate and a concentrate with an ultrafiltration membrane, said method comprising:
    improving the flux rate through the ultrafiltration membrane by carrying out the ultrafiltration of the waste water at a temperature at or above the flocculation temperature of the cellulose ether wherein said flocculation temperature is above 40° C. and wherein the concentrate of the reaction medium and/or wash medium obtained during ultrafiltration is treated with an oxidizing agent such that the dissolved cellulose ether is oxidatively degraded or cellulose ethers insoluble in hot waste water.

2. A process as claimed in claim 1, wherein the concentrate of the reaction medium and/or wash medium obtained during ultrafiltration is treated with an oxidizing agent or cellulose ethers insoluble in hot waste water.

3. The process as claimed in claim 2, wherein methylhydroxyethylcellulose or methylhydroxypropylcellulose is used as the cellulose ethers insoluble in hot waste water.

4. The process as claimed in claim 3, wherein the natural occurring tanning agent is vegetable tannin.

5. The process as claimed in claim 2, wherein hydrogen peroxide and/or ozone is added to the concentrate as the oxidizing agent, optionally in combination with UV light.

6. The process as claimed in claim 1, wherein said preparation of a cellulose ether is the preparation selected from the group consisting of an alkylcellulose ether and an alkylhydroxyalkylcellulose ether.

7. The process as claimed in claim 6, wherein said alkylcellulose ether is methylcellulose, and said alkylhydroxyalkylcellulose is selected from the group consisting of methylhydroxypropyl-cellulose and methylhydroxyethylcellulose.

8. The process as claimed in claim 1 wherein the permeate obtained during the ultrafiltration is purified by nanofiltration.

9. The process as claimed in claim 1, wherein organic liquids are separated off from the liquid reaction medium and/or wash medium by distillation before the ultrafiltration.

10. A method as claimed in claim 1, wherein the preparation of the cellulose ether is carried out in an aqueous alkaline medium.

11. A method as claimed in claim 10, wherein the aqueous alkaline medium contains at least one organic solvent.

12. A method as claimed in claim 1, wherein the wastewater is the liquid reaction medium in which the cellulose ether was prepared or a wash medium in which the cellulose ether was purified or a mixture thereof.

13. A method as claimed in claim 1, wherein, during the ultrafiltration, the shearing forces on the ultrafiltration membrane surface are increased beyond the extent determined by the volume throughput.

14. The process as claimed in claim 1, wherein the permeate obtained during the ultrafiltration, with an ultrafiltration membrane, is optionally purified by nanofiltration, with a nanofiltration membrane, and wherein, during the ultrafiltration and/or the nanofiltration, the shearing forces on the ultrafiltration and/or nanofiltration membrane surface or surfaces are increased beyond the extent determined by the volume throughput.

15. The process as claimed in claim 1, wherein the flocculation temperature is above 40° to about 100° C.

16. The process as claimed in claim 15, wherein the flocculation temperature is above 60° to about 100° C.

17. The process as claimed in claim 1, wherein the wastewater is at a temperature above 60° C.

* * * * *